United States Patent [19]

LaCroix et al.

[11] Patent Number: 5,001,907
[45] Date of Patent: Mar. 26, 1991

[54] BEVERAGE CONTAINER WITH REFRIGERANT GEL

[76] Inventors: Michael J. LaCroix, 17 Viau Rd.; William C. Lampert, 73 Stacey Cir., both of Windham, N.H. 03087; Kenneth M. Pacunas, 18 Craven Ter., Derry, N.H. 03038; Roger S. Spurrell, Jr., 18 Greeley St., Hudson, N.H. 03051

[21] Appl. No.: 476,855

[22] Filed: Feb. 8, 1990

[51] Int. Cl.$^5$ .............................................. F25D 3/08
[52] U.S. Cl. ..................................... 62/457.4; 62/438
[58] Field of Search ................... 62/430, 457.4, 530, 62/438

[56] References Cited

U.S. PATENT DOCUMENTS

| | | | |
|---|---|---|---|
| 2,526,165 | 10/1950 | Smith | 62/438 X |
| 3,161,031 | 12/1964 | Flannery | 62/457.4 |
| 3,302,427 | 2/1967 | Stoner et al. | 62/457.4 |
| 3,302,428 | 2/1967 | Stoner et al. | 62/457.4 |
| 3,715,895 | 2/1973 | Devlin | 62/438 |
| 4,183,226 | 1/1980 | Moore | 62/457.4 |
| 4,357,809 | 11/1982 | Held et al. | 62/457.4 |
| 4,782,670 | 11/1988 | Long et al. | 62/457.4 |

Primary Examiner—Lloyd L. King
Attorney, Agent, or Firm—John E. Toupal; Harold G. Jarcho

[57] ABSTRACT

A beverage container including an inner tubular wall defining a reservoir; a transparent outer tubular wall surrounding the inner wall and spaced therefrom to form an annular chamber having upper and lower annular openings; a top wall joining upper ends of the inner and outer walls and closing the upper opening; a base closing the lower opening; and a refrigerant gel retained within the chamber.

5 Claims, 1 Drawing Sheet

U.S. Patent  Mar. 26, 1991  Sheet 1 of 1  5,001,907
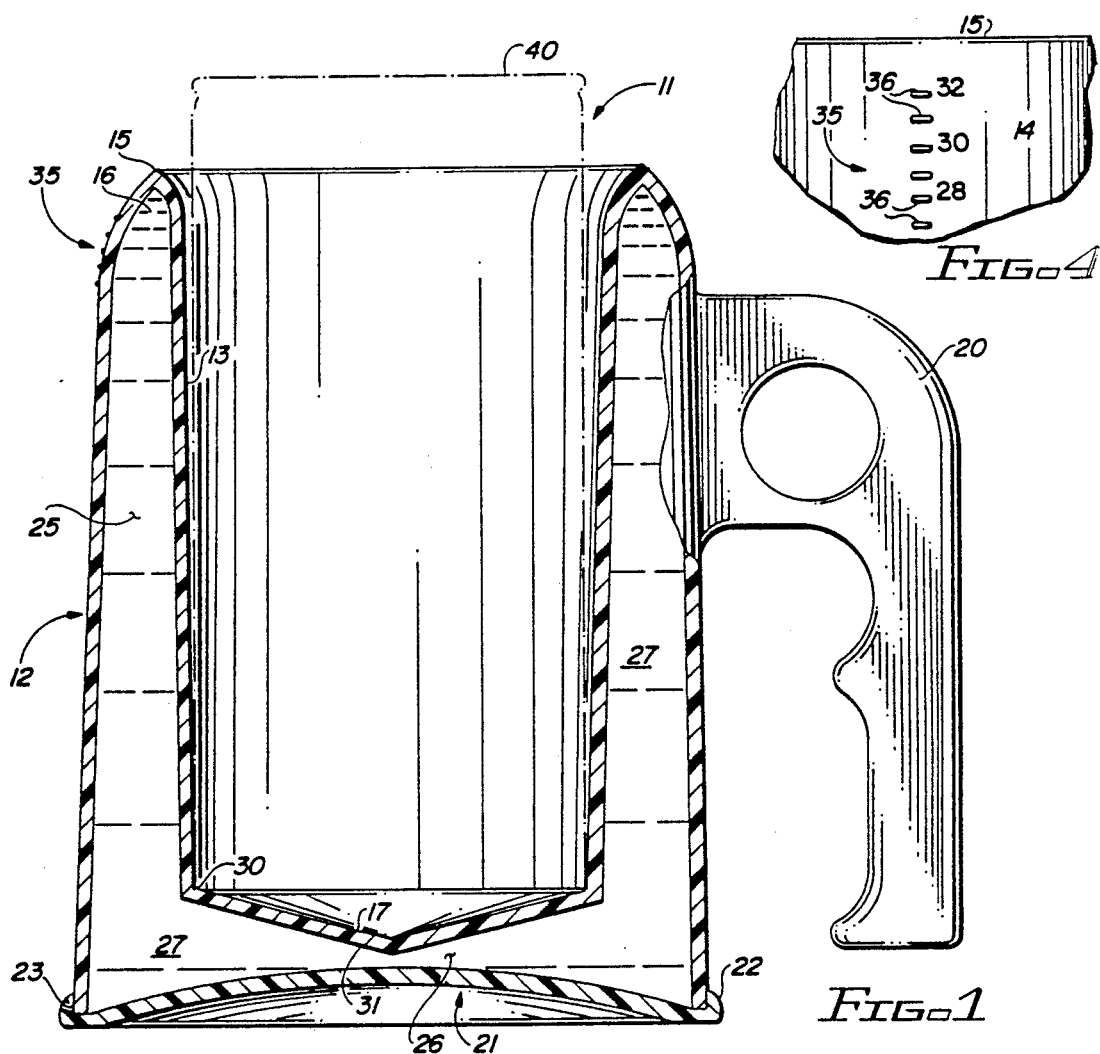
Fig. 1
Fig. 4
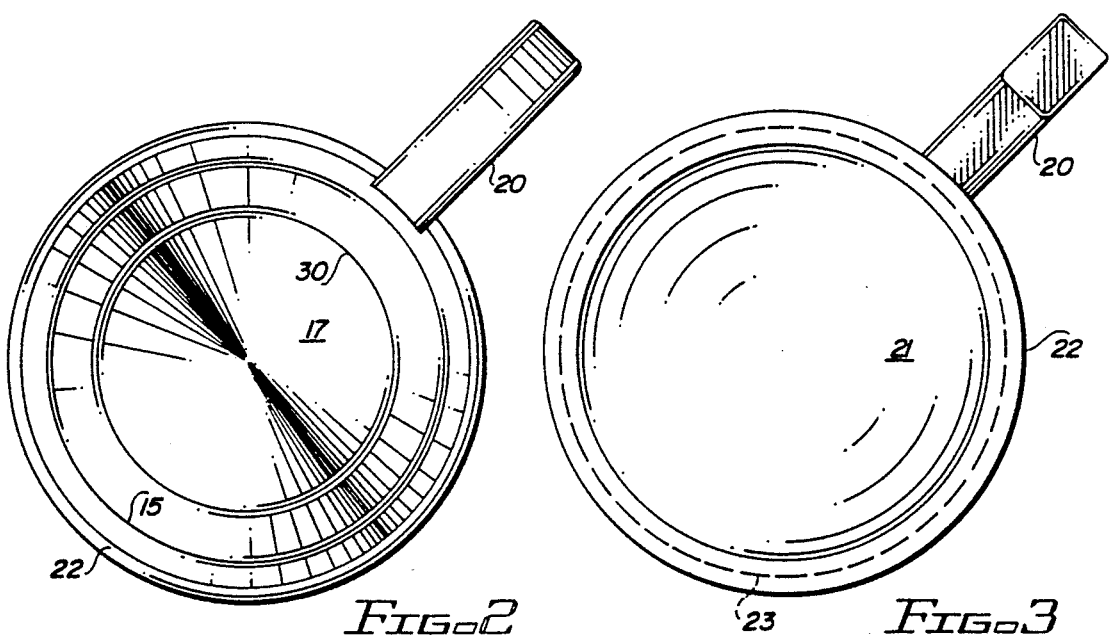
Fig. 2
Fig. 3

BEVERAGE CONTAINER WITH REFRIGERANT GEL

BACKGROUND OF THE INVENTION

This invention relates generally to a container for maintaining beverages in a chilled state, and more particularly to such a container retaining a refrigerant gel material.

Most drinkers desire to consume beverages such as alcoholic beverages and soft drinks when in a chilled condition. Typically, such beverages are stored in a cooled area such as a refrigerator or ice chest in order to lower the temperature to that appropriate for consumption. It is preferable that the desired temperature be maintained until the beverage is fully consumed.

However, typical rates of consumption of such beverages are usually at a relatively slow rate such that the beverages remain exposed to normal room temperatures for sustained periods of time. Consequently, the temperature of the beverage rises towards room temperature with a corresponding loss of desirability for the beverage.

Various prior-art devices have been proposed in attempts to alleviate the aforementioned problems. Several such devices include a double-walled vessel that includes a sealed chamber containing a refrigerant gel which partially encloses a beverage compartment. The refrigerant gel changes state upon being stored for an appreciable period in the freezing compartment of an ordinary refrigerator and is intended to maintain the beverage at a suitable temperature. Examples of refrigerant gel filled containers are disclosed, for example, in U.S. Pat. Nos. 3,680,330; 4,183,226; and 4,357,809. None of these prior devices, however, has proven to be fully satisfactory.

The object of this invention, therefore, is to provide an improved refrigerated gel filled beverage container.

SUMMARY OF THE INVENTION

The invention is a beverage container including an inner tubular wall defining a reservoir; a transparent outer tubular wall surrounding the inner wall and spaced therefrom to form an annular chamber having upper and lower annular openings; a top wall joining upper ends of the inner and outer walls and closing the upper opening; a base closing the lower opening; and a refrigerant gel retained within the chamber. The transparent outer wall permits visual monitoring of the refrigerant gel, enhances the appearance of the container and facilitates design variations with use of different colored gels.

According to one feature of the invention, the inner wall, the outer wall and the top wall comprise an integrally molded unitary structure. This feature minimizes the number of seals required and thereby reduces cost of the container.

According to other features of the invention, a lower edge of the outer wall extends below a lower edge of the inner wall, the container further includes a bottom wall joined to the lower edge of the inner wall and spaced from the base to form therebetween a compartment communicating with the chamber, and the compartment also retains a refrigerant gel. The gel filled compartment improves the thermal transfer characteristics of the container.

According to still other features of the invention, the unitary structure includes the bottom wall, and the base has an outer periphery engaging the lower edge of the outer wall so as to seal the compartment. According to this arrangement, the number of required parts is minimized and a single seal isolates the chamber and the compartment from the external environment. In addition, the one seal is located at the bottom of the container so as to reduce the possibility of contact between the seal and a users mouth and thereby preclude ingestion of the gel material.

According to still another feature of the invention, the base is concave so as to project into the compartment. The concave base enhances the ability of the container to withstand repeated freezing cycles. Also, during assembly of the container, the concave base removes air from the compartment to allow more complete filling thereof with gel material.

According to yet another feature of the invention, the bottom wall is tapered downwardly from the lower edge of the inner wall so as to project a substantial distance into the compartment. This feature facilitates dual use of the unit as either an independent beverage container or a holder for conventional beverage filled cans. In addition, the tapered bottom wall reduces splashing during filling operations of the chamber and compartment with the gel material.

In a preferred embodiment, the container includes a temperature gauge disposed on an upper portion of the outer wall so as to indicate the upper level of the refrigerant gel within the annular chamber. The level of the gel provides an accurate indication of its thermal condition.

DESCRIPTION OF THE DRAWINGS

These and other objects and features of the invention will become more apparent upon a perusal of the following description taken in conjunction with the accompanying drawings wherein:

FIG. 1 is a cross sectional view of a beverage container according to the invention;

FIG. 2 is a top view of the container shown in FIG. 1;

FIG. 3 is a bottom view of the container shown in FIG. 1; and

FIG. 4 is a partial view of the container shown in FIG. 1 and illustrating a temperature gauge portion thereof.

DESCRIPTION OF THE PREFERRED EMBODIMENT

A beverage container 11 includes a integrally molded unitary structure 12 having a tubular inner wall portion 13, a tubular outer wall portion 14, a top wall portion 15 joining upper edges of the inner wall portion 13 and the outer wall portion 14 and closing an annular upper opening 16 formed therebetween, and a bottom wall portion 17 joining lower edges of the inner wall portion 13. The unitary structure 12 additionally includes a handle 20 projecting outwardly from the outer wall portion 14. The unitary structure 12 preferably is injection molded with a suitable transparent plastic such as polycarbonit. Also included in the beverage container 11 is an end cap 21 having a circular outer periphery 22 sealed to a lower edge portion 23 of the outer wall portion 14.

As shown in FIG. 2, the inner wall portion 13 is spaced from the outer wall portion 14 so as to form therebetween an annular chamber 25. Similarly, the bottom wall portion 17 is spaced from the end cap 21 so as to form therebetween a compartment 26 that communicates with the annular chamber 25. Retained within the annular chamber 25 and the compartment 26 is a refrigerant gel material 27. A suitable gel material is disclosed in U.S. Pat. No. 4,357,809.

The end cap 21 is concave so as to project into the compartment 26 as shown in FIGS. 1 and 3. Also, the outer periphery 22 of the end cap 21 is formed by an upwardly directed circular flange that engages the lower outer surface portion 23 of the outer wall portion 14. To assemble the container 11, the peripheral flange 22 of the end cap 21 is snap fitted over the lower edge portion 23 of the outer wall 14 after filling of the annular chamber 25 and the compartment 26 with the refrigerant gel material 27. During this assembly process, the concave end cap 21 ejects air from the annular chamber 25 and the compartment 26 so as to permit a more complete filling thereof with the refrigerant gel material 27. The bottom wall portion 17 is tapered from: the lower edge of the inner wall portion 13 so as to define a dimple 31 that projects into the compartment 26 as shown in FIGS. 1 and 2.

As shown in FIGS. 1 and 4, a temperature gauge 35 is provided on an upper outer surface portion of the outer wall portion 14. The temperature gauge 35 includes a plurality of vertically spaced apart graduations 36 imprinted on the outer surface of the outer wall portion 14. Also included in the temperature gauge 35 are numerals associated with the graduations 36 and indicative of the temperature of the refrigerant gel 27 within the annular chamber 25. The graduations 36 straddle the upper level of the refrigerant gel 27 within the annular chamber 25.

Prior to use, the beverage container 11 is placed within a freezer of a refrigerator (not shown). After a period required for the refrigerant gel material 27 to freeze, the container 11 is removed and a reservoir 41 formed by the unitary structure 12 is filled with a beverage to be consumed. Since the gel material becomes crystalline upon freezing its readiness to perform a desired cooling function can be readily observed through the transparent outer wall portion 14 of the unitary structure 12. In addition, since the gel material 27 expands and contracts during changes in state, an accurate indication of its thermal condition is provided by the upper level of the gel material 27 within the annular chamber 25 as indicated by the graduations 36 of the temperature gauge 35.

The container 11 also can be used as a holder for conventional beverage filled cans. As shown by dashed lines in FIG. 1, a can 40 inserted into the container 11 will rest upon the annular transition surface 30 between the inner wall portion 13 and the tapered bottom wall portion 17. The length of the inner wall portion 13 between the transition surface 30 and the top wall portion 15 preferably is about 5 inches so as to position the upper edge of a conventional can 40 above the top wall portion 15. When the unit 11 is used independently as a beverage container, the volume defined by the tapered bottom wall portion 17 below the transition surface 30 provides the reservoir 41 with additional capacity that accommodates the entire contents of a conventional 12 ounce container.

Obviously, many modifications and variations of the present invention are possible in light of the above teachings. It is to be understood, therefore, that the invention can be practiced otherwise than as specifically described.

What is claimed is:

1. A beverage container comprising:
   an integrally molded unitary structure including an inner tubular wall portion, a bottom wall portion joined to a lower edge of said inner wall portion and defining therewith a reservoir, a transparent outer tubular wall portion surrounding and spaced from said inner wall portion so as to form therewith an annular chamber having upper and lower openings, a top wall portion joining upper end of said inner and outer wall portions and closing said upper opening;
   a base means engaging a lower edge of said outer tubular wall portion so as to close, said lower opening, said base means being spaced from said bottom wall portion so as to form therebetween a compartment communicating with said chamber; and
   a refrigerant gel retained within said annular chamber and said compartment.

2. A container according to claim 1 wherein said base means is concave so as to project into said compartment.

3. A container according to claim 1 wherein said unitary structure includes a handle means projecting outwardly from said outer wall.

4. A container according to claim 1 wherein said bottom wall is tapered downwardly from said lower edge of said inner wall in a conical shape so as to project a substantial distance into said compartment.

5. A container according to claim 1 including a temperature gauge disposed on an upper portion of said outer wall so as to indicate the upper level of said refrigerant gel within said annular chamber.

* * * * *